Jan. 30, 1951  W. P. DALRYMPLE  2,539,896
AIR COMPRESSOR
Filed Oct. 28, 1946
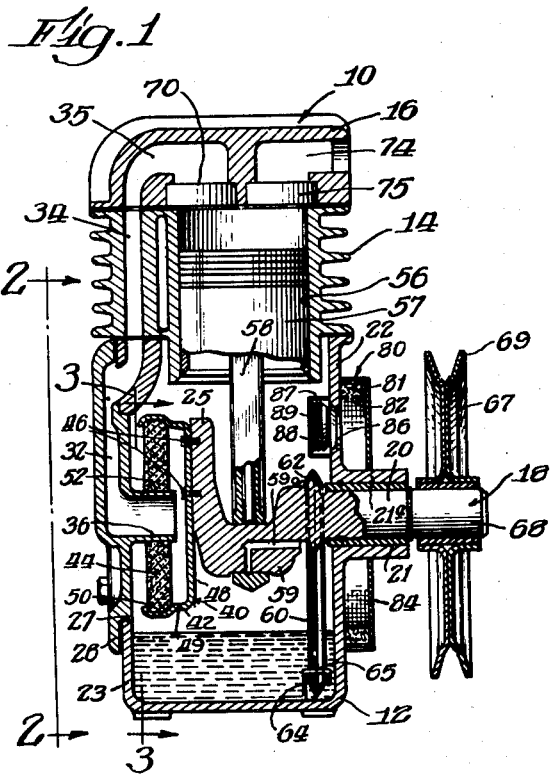
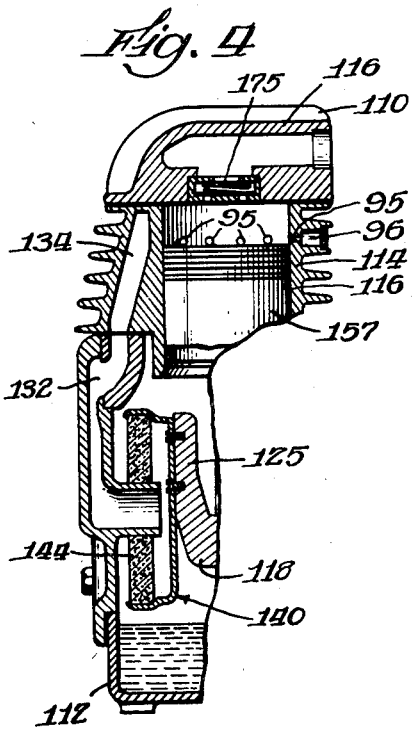
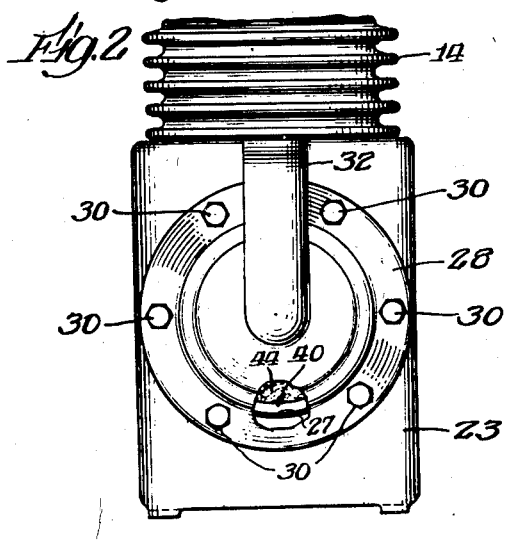
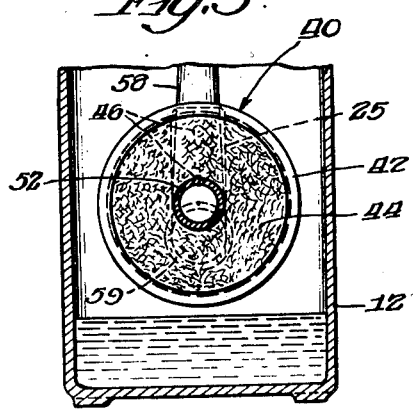
Inventor:
William P. Dalrymple
By Wallace and Cannon
Attys Patented Jan. 30, 1951

2,539,896

UNITED STATES PATENT OFFICE 2,539,896

AIR COMPRESSOR

William P. Dalrymple, Rochester, N. Y., assignor to American Brake Shoe Company, Wilmington, Del., a corporation of Delaware Application October 28, 1946, Serial No. 706,262

13 Claims. (Cl. 230—172)

This invention relates to air compressors and more particularly to air compressors of the character in which air to be compressed is drawn through the crankcase to the compression chamber of the compressor.

Air compressors in which air is drawn through the crankcase to the compression chamber have been heretofore known to the art. However, in such compressors entrained oil or the like, in the air drawn from the crankcase has passed into the compression chamber and in the compressed air emitted therefrom. Inasmuch as it is important that compressed air used for certain purposes such as, for example, in paint spray work and the like, be free of oil or other foreign matter, compressors of the aforesaid character are often not well suited to compress air for many purposes. It is, therefore, the primary object of my invention to so arrange a compressor, of the character wherein the air to be compressed is drawn through the crankcase, that the air passing from the crankcase to the compression chamber is efficiently filtered so that entrained oil or the like is removed therefrom.

It is a further object of my invention to construct a compressor, of the general character hereinbefore referred to, in such a manner that the air drawn into the compressor during the operation of the latter is filtered prior to entry into the crankcase and is further filtered prior to entry into the compression chamber from the crankcase.

Another object of my invention is to mount a rotatable filter element in a compressor of the aforesaid character in such a manner that the air entering the compression chamber must pass through the filter element, transversely to the direction of rotation thereof, so that oil or other foreign matter is filtered from the air, and the oil thus removed by the filter element is returned to the crankcase by the centrifugal force to which it is subjected because of the rotation of the filter element.

Another object of my invention is to associate an air intake filter with the crankshaft of an air compressor in such a manner that the filter element thereof rotates substantially transversely to the direction of the flow of intake air therethrough.

Yet another object of my invention is to construct an air compressor having a novel air filter associated with the air intake thereof in such a manner that oil which, during periods of nonoperation of the compressor or like periods, might seep through the filter element thereof, will be centrifuged back out through the filter element upon subsequent operation of the compressor.

A further object of my invention is to construct a compressor wherein air is drawn in through the crankcase thereof to the compression chamber, and wherein the crankcase is pressurized at certain times to assist in feeding the air therefrom to the compression chamber.

Other and further objects of the present invention will be apparent from the following description and claims and are illustrated in the accompanying drawing which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a sectional elevational view of an air compressor embodying my invention;

Fig. 2 is a partial elevational view of the compressor shown in Fig. 1 taken substantially along the line 2—2 in Fig. 1;

Fig. 3 is a detail sectional view taken substantially along the line 3—3 in Fig. 1; and Fig. 4 is a partial sectional view similar to Fig. 1 but showing a modified form of my invention.

For purposes of disclosure my invention is shown in the accompanying drawings as embodied in a compressor 10 having a crankcase 12, a cylinder jacket 14 and a head 16, the crankcase 12, cylinder jacket 14 and head 16 being connected together by any suitable means such as, for example, by conventional hold-down studs (not shown).

A crankshaft 18 is mounted in and carried by the crankcase 12 and has one end portion 20 journaled in a bearing 21 mounted in a boss 21a projecting from a side wall 22 of the crankcase 12. The other end of the crankshaft 18 projects inwardly across the crankcase 12 toward the other side wall 23 thereof and terminates in a balance weight 25 in spaced relation to the side wall 23.

As best seen in Figs. 1 and 2 the side wall 23 of the crankcase 12 has an opening 27 formed therein which is normally closed by a cover plate 28 fastened to the side wall 23 by any suitable means such as, for example, bolts 30. The cover plate 28 has an air intake manifold 32 formed therein which, as is best seen in Fig. 1, when the cover plate 28 is properly positioned on the side wall 23, is in alignment with, and connected to, an intake air manifold 34 provided in the side wall of the cylinder jacket 14. A nipple or conduit 36, forming an extension of the manifold 32 formed in the cover plate 28, extends inwardly toward the side wall 22 within the crankcase 12 for a purpose which will presently be explained in greater detail hereinafter.

A filter 40 having a substantially dish-shaped casing 42 and a filter element 44 is attached to the outer face of the balance weight 25 on the crankshaft 18 by screws 46 or other suitable means. The filter casing 42 has a substantially flat disk-shaped side wall 48 having a flange 49 projecting substantially transversally from the outer peripheral edge portion thereof. The flange 49 tapers outwardly somewhat from the side wall 48, for purposes which will be presently explained in greater detail, and has a groove 50 formed in the inner face thereof adjacent to the free edge portion thereof.

The filter element 44 is substantially disk-shaped and, when mounted in the filter 40, the peripheral edge portion thereof is engaged with the groove 50 formed in the inner face of the flange 49 on the filter casing 42. A hole 52 is provided in the center portion of the filter 44 and, when my filter 40 is mounted on the balance weight 25 of the crankshaft 18 in the manner heretofore described, the nipple 46, which projects from the manifold 32, extends through the hole 52 in the filter element 44 in relatively tight frictional engagement with the inner peripheral edge portions of the filter element 44 adjacent to the opening 52.

A conventional cylinder 56 is provided in the cylinder jacket 16, the lower end (as viewed in Fig. 1) of the cylinder 56 opening into the crankcase 12, and a conventional piston 57 having a connecting rod 58 is reciprocally mounted in the cylinder 56 in the usual manner. The lower end portion (as viewed in Fig. 1) of the connecting rod 58 is rotatably connected to a throw 59 of the connecting rod 18 positioned between the one end portion 20 and the balance weight 25 thereof, oil passages 59a being provided in the throw 59 to permit the feeding of lubricant into the connection between the connecting rod 58 and the crankshaft 18 as will be presently described in greater detail. A substantially circular-shaped slinger ring 60 encircles the crankshaft 18 and the upper portion of the slinger ring 60 rests on a substantially V-shaped ridge 62 formed on the crankshaft 18 adjacent to the throw 59 thereof, the annular member of slinger-ring 60 being formed in a V-shape complementary to the ridge 62. A lug 64 is fastened to the bottom of the crankcase 12 by welding or other suitable means and has a projecting head 65 which, when the slinger-ring 60 is properly positioned on the V-shaped ridge 62 overlies the lower portion of the slinger-ring 60 to thereby retain it on the ridge 62 in engagement therewith. As is best seen in Fig. 1, when my compressor 10 is prepared for normal operation the crankcase 12 thereof is filled with oil to a level which is above the lower end portion of the slinger ring 60 and below the level of the opening 27 for lubrication purposes as will be more specifically described hereinafter.

A V-belt drive pulley 67 is mounted on and secured to a hub 68 formed on the outer end portion 20 of the crankshaft 18 and has a V-shaped notch 69 formed in the rim thereof in which may be mounted, in the usual manner, a drive belt (not shown) of the type which is well-known to the art as a V-belt, by which the drive pulley 67 may be driven by a motor or other suitable means in the usual manner to thereby rotate the crankshaft 18 and reciprocate the piston 57.

In the form of my invention illustrated in Figs. 1 to 3 an intake valve 70, which may be any one of the usual types well known to the art, is mounted in the intake passage 35 formed in the head 16. An exhaust passage 74 is also provided in the head 16 and a conventional type exhaust valve 75, of any one of several types well known to the art, is provided therein to control the discharge of compressed air from the compressor 10.

A substantially ring-shaped filter 80 comprising an annular-shaped filter element 81 having a screen 82 wrapped therearound is positioned on the outer face of the side wall 22 of the crankcase 12 and is retained thereon by a retaining plate 84 mounted on the boss 21a projecting from the side wall 22. An opening 86 is formed in the sidewall 22 inwardly of outer edges of the filter 80, and an open cage 87 is mounted on the inner face of the side wall 22 over the opening 86. An inwardly opening check-valve 88 is mounted within the cage 87 and is yieldingly urged toward seating engagement with the edges of the opening 86 by a relatively light spring 89 mounted within the cage 87; the checkvalve 88 being operable to be opened by the difference in air pressure thereon and thereby admit air from the atmosphere into the crankcase 12 when the pressure in the crankcase 12 is less than that of the air surrounding the compressor 10; and the spring 89 being operable when the pressure within the crankcase 12 is equal to, or greater than, the pressure of the air surrounding the crankcase 12, to seat the valve 88 on the edge of the opening 86 to thereby close the opening 86 and prevent outward flow of air therethrough from the crankcase 12.

In the operation of the compressor 10 a drive belt (not shown) is mounted on the drive pulley 67 and connected to a driving motor or other suitable driving means to thereby rotate the pulley 67. Rotation of the pulley 67 causes the crankshaft 18 to rotate in the bearing 21 and thereby, through the action of the throw 59 and the connecting rod 58 causes the piston 57 to be reciprocated in the cylinder 56 in the usual manner. Rotation of the crankshaft 18 also causes the slinger ring 60, which rests thereon in engagement with the ridge 62, to be rotated and, inasmuch as during the operation of my compressor 10 oil is carried in the lower end portion of the crankcase 12 and covers the lower end portion of the slinger ring 60, the rotation of the slinger ring 60 causes a spray of oil to be thrown upwardly within the crankcase 12 to bathe the moving parts with oil and thereby provide lubrication therefor. Some of the oil so thrown up, enters the lower end portion of the cylinder 14 to lubricate the sidewalls thereof, and other parts of the oil enter the oil passages 59a to lubricate the connection between the connecting rod 58 and the crankshaft 18. It will be understood that other suitable oil passages may be provided as desired by those skilled in the art without departing from the purview of my invention.

During the operation of my novel compressor 10 shown in Figs. 1 to 3, inclusive of the accompanying drawings, as is usual in most compressors of the reciprocating type, the exhaust valve 75 is closed, and the intake valve 70 is open, during the intake stroke of the piston 57, that is, while the piston 57 is moving downwardly as viewed in Fig. 1. Therefore, because of the reduction of pressure in the upper portion of the cylinder 56 above the piston 57, as the piston 57 moves downwardly away from the head 16, air flows from the crankcase 12 through the filter element 44 into the casing 42, and then through the manifolds 32 and 34, the air intake passage 35 and the intake valve 70 into the upper end portion of the cylinder 56. However, in addition to this reduction in pressure in the upper portion of the cylinder 56, it will be noted that the valve 88 being closed against the edge of the opening 86 by the spring 89, the downward movement of the piston 57 through the cylinder 56 causes a compression of the air in the lower end portion of the cylinder 56 and in the crankcase 12 which aids in forcing air through the filter 40, the manifold 32 and 34, the intake passage 35 and the intake valve 70 into the compression chamber in the cylinder 56 above the piston 57.

During the compression stroke of the piston 57, that is, while the piston 57 is moving upwardly as viewed in Fig. 1, the intake valve 70 is closed and the exhaust valve 75 is open. Therefore, during the compression stroke of the piston 57 the air previously drawn into the compression chamber in the cylinder 56 above the piston 57 is compressed and forced out through the exhaust valve 75 and the exhaust passage 74 from which it is carried by suitable pipes or conduits (not shown) attached thereto to the reservoir or other unit where it is to be used. However, the intake valve 70 being closed so that no air can pass from the upper end of the cylinder 56 back down to the crankcase 12 during a compression stroke of the piston 57, the upward movement of the piston 57 in the cylinder 56 tends to cause a reduction of pressure within the crankcase 12 so that the valve 88 is unseated against the spring 89 so that the opening 86 is opened and air, from outside the compressor 10 passes through screen 82 and the filter element 81 of the filter 80, and through the opening 86 into the crankcase 12 and the lower end of the cylinder 56.

From the foregoing it will be apparent that my compressor provides somewhat of a forced feed for the air entering the compression chamber thereof, the air being forced from the crankcase 12 into the compression chamber in the upper portion of the cylinder 56 during an intake stroke of the piston 57, and air again re-entering the crankcase 12 past the valve 88 from the atmosphere during a compression stroke of the piston 57.

It will be noted that the air, drawn in through the crankcase 12 to the compression chamber of the compressor 10 during the intake stroke of the piston 57, passes through the spray of oil thrown up by the slinger ring 60 and a considerable amount of oil is entrained in this air. It is normally desirable that air compressed by a compressor be free of oil or other foreign matter, and it is especially essential in certain types of work for which my compressor is used such as, for example, in paint spray work, or the like, that no oil be entrained in the air which is compressed. Therefore, in my compressor 10, I have provided a novel filter 40, having a filter element 44 through which air entering the compression chamber of my compressor 10 must pass so that entrained oil and the like is removed therefrom. The filter element 44 may be made of any suitable filtering material, although I prefer to make it of felt, and it will be noted that in passing through the filter element 44 the oil or other foreign material entrained in the air drawn into the crankcase 12 is removed from the air by the inherent resistance of the filter element 44 to the flow of oil therethrough, and that the rotation of the filter 40 assists in maintaining the filter element 44 free of excessive oil, the oil removed from the air by the filter element 44 being subjected to centrifugal force, because of the rotation of the filter element 44, which tends to throw the oil outwardly and along the tapered flange 49 back into the crankcase 12.

Also it will be noted that in certain cases where a certain amount of oil may have seeped through the filter element 44 and rests within the case 42 of the filter 40, such as, for example, when the compressor 10 has not been in operation for sometime, when the compressor 10 is started in operation again the oil within the casing 42 of the filter 40 is subjected to relatively high centrifugal force because of the rotation of the filter 40 and therefore the oil will be centrifuged along the flange 42 and back out through the filter element 44 into the crankcase 12.

The modified form of my compressor which I have shown in Fig. 4 operates on the same general principle as the preferred form of the compressor shown in Figs. 1 to 3, inclusive, and parts which are the same as parts shown in the preferred form of my invention are indicated by the same reference numerals with the prefix "1" added thereto. All of the changes made in the modified form of my compressor as shown are embodied in the valve mechanism in the upper end portion of the cylinder jacket 114 and the head 116.

It will be noted that the changes made in the modified form comprise the following: The air intake passage 35 and the intake valve 70 have been eliminated and in their place passages 95 extend through the sidewalls of the cylinder jacket 114 and interconnect the interior of the cylinder 156 with the interior of a hollow channel 96 which extends around the cylinder jacket 114, and is interconnected with the manifold 134 in the cylinder jacket 114. The exhaust valve 175 shown in Fig. 4 is the same as valve 75 shown in Figs. 1 to 3, being merely repositioned toward the center of the head 116 in Fig. 4 rather than off toward one side as shown in Fig. 1.

The openings 95 in the walls of the cylinder jacket 114 are positioned sufficiently far below the head 116 that a compression chamber is provided in the upper end of the cylinder 156, the piston 157 on its intake or downward stroke (as viewed in Fig. 4) uncovering the openings 95 and drawing air from the crankcase 112, through the filter 140, the manifolds 132 and 134, the channel 96 and the passages 95 into the cylinder 156, and on its compression or upward stroke (as viewed in Fig. 4) against covering the passages 95 so as to effectively compress the air trapped in the upper end portion of the cylinder 114 thereabove.

It is felt that from the detailed description heretofore set forth with respect to the preferred form of my invention shown in Figs. 1 to 3, inclusive, together with the description heretofore set forth with respect to the construction of the modified form of my invention as shown in Fig. 4, the operation of the modified form of my invention as shown in Fig. 4 will be apparent to those skilled in the art without a detailed description of the operation thereof. However, as a brief résumé it should be stated that the filter 140 is fastened to the balance weight 125 on the crankshaft 118 of my modified form of compressor 110, and, during operation of the compressor 110, rotates therewith so that oil or other foreign matter entrained in the air drawn from the crankcase 112 into the cylinder 114 is filtered therefrom by the filter element 144, and is thrown back into the crankcase 112 by the centrifugal force exerted thereon because of the rotation of the filter 140.

Also, it will be noted that the construction of the crankcase 112 is identical to that of the crankcase 12 shown in Figs. 1 to 3, inclusive, and that, therefore, air drawn thereinto passes through a filter (not shown) identical to the filter 80, and also, a checkvalve (not shown) which is identical to the checkvalve 88 is used in the crankcase 112 so that the air fed therefrom to the cylinder 114 is fed under some pressure in a manner similar to that heretofore discussed with respect to the form of my invention shown in Figs. 1 to 3, inclusive.

From the foregoing it will be seen that I have provided a novel form of reciprocating air compressor of the type wherein air is drawn through the crankcase into the compression chamber thereof, to be compressed and discharged therefrom, and wherein this air upon leaving the crankcase and before flowing to the compressing chamber is efficiently filtered so as to remove entrained oil or other foreign matter therefrom.

Further it will be seen that in the novel form of air compressor which I have disclosed air drawn into the compression chamber through the crankcase is filtered before entering the crankcase so as to protect the crankcase from contamination by foreign matter.

Also it will be noted that, although the air drawn into the compression chamber of my novel compressor is drawn through an oil spray within the crankcase, oil entrained therein is efficiently removed therefrom prior to its passage into the compression chamber by a novel rotating filter wherein the oil or other foreign matter entrained in the air is removed therefrom by the rotating filter element and returned by centrifugal force to the crankcase.

Also, it will be seen that I have provided a novel compressor wherein the air fed into the compression chamber thereof is fed thereinto under pressure formed within the crankcase.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a compressor, a crankcase, a cylinder, a piston for compressing air within said cylinder, means, including a crankshaft rotatably mounted in said crankcase, for reciprocating said piston within said cylinder, means including said crankcase for admitting air to said cylinder, and valve means for said cylinder, a filter element mounted in said crankcase in the path of air passing from said crankcase to said cylinder and adapted to filter air admitted to said cylinder from said crankcase, and means connecting said filter element of said crankshaft for roation therewith.

2. In a compressor, the combination of a crankcase having an air inlet and an air outlet, a cylinder, a piston, means, including a crankshaft rotatably mounted in said crankcase, for reciprocating said piston within said cylinder, means including said crankcake for admitting air to said cylinder, and valve means for said cylinder, a filter mounted in said crankcase in association with the inlet to said air outlet and functioning to filter air passing from said crank case to said cylinder, said filter comprising a substantially dish-shaped casing and a filter element extending across one face of said casing, said filter element being positioned in the path of air admitted to said cylinder, and means connecting said filter element to said crankshaft for rotation therewith.

3. In a compressor, the combination of a crankcase, a cylinder connected to said crankcase, a piston, means, including a crankshaft rotatably mounted in said crankcase for reciprocating said piston within said cylinder, means including said crankcase for admitting air to said cylinder, and valve means for controlling the flow of air into and out of said cylinder, a filter mounted in said crankcase, said filter comprising a casing having a side wall and a continuous flange extending angularly from the peripheral edge portion thereof, and a filter element mounted in said casing and extending across said flange in spaced relation to said side wall, said filter element having an opening formed in the center thereof, means, including a conduit engageable with said filter element within said opening, connecting the interior of said filter, between said filter element and said casing, with said cylinder, and means for rotating said filter element during operation of said compressor.

4. In an air compressor, a crankcase, a cylinder mounted on said crankcase, a piston reciprocable within said cylinder, an intake air manifold connecting said crankcase to said cylinder for introducing air into said cylinder to be compressed by said piston, and means for exhausting compressed air from said cylinder, a crankshaft rotatably carried by said crankcase and operatively connected to said piston, a filter mounted in said crankcase and connected to said crankshaft for rotation with the latter, said filter comprising a casing having an open face and a filter element extending across said face, said filter element having an opening provided in the center portion thereof, means establishing a communicating passage from the interior of said filter to the interior of said air intake manifold, said means extending through said opening and in engagement with the portion of said filter element adjacent thereto.

5. In an air compressor, a crankcase, a cylinder mounted on said crankcase, and a piston reciprocable within said cylinder, a filter mounted in said crankcase, said filter comprising a casing and a filter element mounted in said casing in spaced relation to one side thereof, means establishing a communicating passage between the interior of said crankcase and said cylinder, said means including said filter element and the area between said side and said filter element, means rotatably mounted in said crankcase and operable upon rotation to reciprocate said piston, means for exhausting air from said cylinder, and means drivingly connecting said filter to said means for reciprocating said piston for rotation thereby when said piston is reciprocated.

6. In an air compressor, the combination of a crankcase having an air inlet in communication with the atmosphere, a cylinder mounted on said crankcase, a piston reciprocable within said cylinder, an air intake manifold operatively connecting said crankcase to said cylinder for introducing air into said cylinder to be compressed by said piston, and means for exhausting compressed air from said cylinder, a filter mounted in said crankcase, said filter comprising a casing having a substantially solid side wall and a continuous flange projecting from the peripheral edge portion of said side wall, and a filter element mounted within said flange, means extending through the center of said filter element and establishing a communicating passage from said intake manifold to the interior of said filter between said filter element and said side wall, means rotatably mounted in said crankcase and operable upon rotation to reciprocate said piston, and means drivingly connecting said filter to said last named means for rotation thereby when said piston is reciprocated.

7. In an air compressor, a crankcase having air inlet and air outlet means, a cylinder mounted on said crankcase, a piston reciprocable within said cylinder, an intake air manifold connected to said crankcase and said cylinder for feeding air from said crankcase into said cylinder to be compressed by said piston, and means for exhausting compressed air from said cylinder, a filter mounted in said crankcase in position to filter air passing through said outlet means, said filter comprising a side wall, a filter element spaced from and substantially parallel to said side wall, and an annular member in sealed engagement with the peripheral edge portion of both said side wall and said filter element, means rotatably mounted in said crankcase and operatively connected to said piston, said last named means being operable upon rotation to reciprocate said piston, and means operatively connecting said filter to said last named means for rotation thereby when said piston is reciprocated.

8. In an air compressor, the combination of a crankcase, a cylinder connected to said crankcase, and a piston reciprocable within said cylinder, means including a valve for admitting air into said crankcase, means rotatably mounted in said crankcase and operatively connected to said piston, said last named means being operable upon rotation to reciprocate said piston, and means for conducting air from said crankcase to said cylinder, said last named means comprising a filter element mounted in said crankcase and through which said air passes in passing from said crankcase to said cylinder, said filter element being operatively connected to said means for reciprocating said piston and rotatable thereby during reciprocation of said piston by said means.

9. In an air compressor, the combination of a crankcase, a cylinder connected to said crankcase, and a piston reciprocable within said cylinder, means including a valve for admitting air into said crankcase, said valve being operable to permit the passage of air in one direction only, a crankshaft rotatably mounted in said crankcase and operatively connected to said piston, means for rotating said crankshaft and thereby reciprocating said piston, means for conducting air from said crankcase to said cylinder, said last named means including a filter element through which said air passes in a predetermined direction in passing from said crankcase to said cylinder, said filter element being connected to said crankshaft for rotation therewith in a direction substantially transverse to said predetermined direction, and means for exhausting air from said cylinder.

10. A compressor comprising a casing affording a crankcase and a compression chamber, means, including a filter, for feeding air from the atmosphere through said crankcase to said compression chamber, means for compressing air in said compression chamber, said last named means including a member mounted in said crankcase and rotatable therein during a compressing operation, and means for exhausting air from said compression chamber, said filter including a filter element mounted in said crankcase in a position whereby air in passing through said first named means from said crankcase to said chamber passes therethrough and is filtered thereby, said filter element being connected to said means for compressing air and rotatable thereby during a compressing operation of said means.

11. A compressor comprising a casing affording a crankcase and a cylinder, a piston reciprocable within said cylinder, a crankshaft rotatably mounted in said crankcase and operably connected to said piston, means including a filter mounted in said crankcase for feeding air from the interior of said crankcase to said cylinder, means for rotating said crankshaft and thereby reciprocating said piston, and means for exhausting air from said cylinder, said filter including a filter element connected to said crankshaft and rotatable therewith.

12. In a compressor, the combination of a crankcase, a cylinder connected to said crankcase and a piston reciprocably mounted within said cylinder, a crankshaft rotatably mounted in said crankcase and operatively connected to said piston, means for rotating said crankshaft and thereby reciprocating said piston, a filter connected to said crankshaft for rotation therewith, said filter comprising a substantially dish-shaped casing and a filter element mounted in said casing, the peripheral edge portion of said filter element being in engagement with the inner surface of said casing, means for passing air from the atmosphere into said crankcase, and means projecting into said filter for drawing air from said crankcase through said filter element into said cylinder, and means for exhausting air from said cylinder.

13. A compressor comprising a crankcase, a cylinder mounted on said crankcase, a head mounted on said cylinder, an intake manifold extending longitudinally to said cylinder, said cylinder having openings extending therethrough and in communication with said manifold, a piston reciprocably mounted within said cylinder, a crankshaft rotatably mounted within said crankcase and operatively connected to said piston, means for rotating said crankshaft and thereby reciprocating said piston, valve means mounted in a side wall of said crankcase for admitting air thereinto, a filter attached to said crankshaft and rotatable therewith within said crankcase, said filter comprising a substantially dish-shaped casing and a filter element mounted in said casing, the entire peripheral edge portion of said filter element engaging the inner surface of said casing, said filter element being substantially porous and adapted to pass air therethrough from said crankcase into said filter casing, and conduit means connecting the interior of said filter between said filter element and said casing with said manifold, said conduit means being adapted to pass air from the interior of said filter into said manifold.

WILLIAM P. DALRYMPLE.

REFERENCES CITED

The following references are of record in the file of this patent:

UNITED STATES PATENTS

| Number | Name | Date |
| --- | --- | --- |
| 2,053,593 | Ziska et al. | Sept. 8, 1936 |